United States Patent [19]
Johnson et al.

[11] Patent Number: 5,787,266
[45] Date of Patent: Jul. 28, 1998

[54] APPARATUS AND METHOD FOR ACCESSING SPECIAL REGISTERS WITHOUT SERIALIZATION

[75] Inventors: William M. Johnson; Thang M. Tran; Rupaka Mahalingaiah, all of Austin, Tex.

[73] Assignee: Advanced Micro Devices, Inc., Sunnyvale, Calif.

[21] Appl. No.: 603,805

[22] Filed: Feb. 20, 1996

[51] Int. Cl.$^6$ ............................................. G06F 9/00
[52] U.S. Cl. ................................... 395/392; 395/393
[58] Field of Search ................................ 395/392, 393, 395/419, 591

[56] References Cited

U.S. PATENT DOCUMENTS

| | | | |
|---|---|---|---|
| 4,044,338 | 8/1977 | Wolf | 364/929.2 |
| 4,453,212 | 6/1984 | Gaither et al. | 711/2 |
| 4,807,115 | 2/1989 | Torng | 395/393 |
| 4,858,105 | 8/1989 | Kuriyama et al. | 395/582 |
| 5,226,126 | 7/1993 | McFarland et al. | 395/394 |
| 5,226,130 | 7/1993 | Favor et al. | 711/125 |
| 5,497,499 | 3/1996 | Garg et al. | 395/395 |
| 5,524,263 | 6/1996 | Griffith et al. | 395/393 |
| 5,590,352 | 12/1996 | Zuraski et al. | 395/393 |

FOREIGN PATENT DOCUMENTS

| | | |
|---|---|---|
| 0259095 | 3/1988 | European Pat. Off. . |
| 0381471 | 8/1990 | European Pat. Off. . |
| 0459232 | 12/1991 | European Pat. Off. . |
| 0651320 | 3/1995 | European Pat. Off. . |
| 2263985 | 8/1993 | United Kingdom . |
| 2263987 | 8/1993 | United Kingdom . |
| 22881422 | 3/1995 | United Kingdom . |

OTHER PUBLICATIONS

Intel, "Chapter 2: Microprocessor Architecture Overview," pp. 2–1 through 2–4.

Michael Slater "AMD's K5 Designed to Outrun Pentium," Microprocessor Report, vol. 8, No. 14, Oct. 24, 1994, 7 pages.

Sebastian Rupley and John Clyman, "P6: The Next Step?," PC Magazine, Sep. 12, 1995, 16 pages.

Tom R. Halfhill, "AMD K6 Takes On Intel P6," BYTE, Jan. 1996, 4 pages.

Gwennap, Linley, p6 underperforms on 16 bit software, Jul. 31, 1995, Microprocessor Report.

*Primary Examiner*—William M. Treat
*Assistant Examiner*—Patrice L. Winder
*Attorney, Agent, or Firm*—B. Noel Kivlin; Conley, Rose & Tayon

[57] ABSTRACT

A microprocessor employing an apparatus for performing special register writes without serialization is provided. The apparatus detects special register write instructions when the instructions are dispatched, and stores an indication of the write in a special register dependency block. Instructions subsequent to the special register write instruction are examined for both explicit and implicit dependencies upon the special register write. If a dependency is detected with respect to a particular instruction, the instruction is dispatched to a reservation station along with an indication of the dependency. Instructions subsequent to the special register write instruction which are not dependent upon the special register are dispatched without an indication of special register dependency. Instructions without dependencies may speculatively execute prior to instructions with dependencies, or even prior to the special register write instruction. In one particular embodiment employing the x86 microprocessor architecture, the microprocessor detects updates to the DS, ES, FS, and GS segment registers (i.e. the data segment registers). Updates to other segment registers are serialized.

19 Claims, 7 Drawing Sheets

APPARATUS AND METHOD FOR ACCESSING SPECIAL REGISTERS WITHOUT SERIALIZATION

BACKGROUND OF THE INVENTION

1. Field of the Invention

This invention relates to the field of microprocessors and, more particularly, to an apparatus for accessing special registers without serializing the instruction stream.

2. Description of the Relevant Art

Superscalar microprocessors achieve high performance by executing multiple instructions during a clock cycle and by specifying the shortest possible clock cycle consistent with the design. As used herein, the term "clock cycle" refers to an interval of time accorded to various stages of an instruction processing pipeline. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively.

Microprocessors typically include a plurality of architected registers. The architected registers are accessible via instructions, as opposed to other registers which may be employed to store various values used by the microprocessor. For example, the instruction processing pipeline of the microprocessor may include registers which store the instruction at each stage of the pipeline. These pipeline registers are not accessible via instructions. However, the architected registers may be specified as source or destination storage locations for instructions.

The architected registers may be divided into two groups: general purpose registers and special purpose (or simply special) registers. General purpose registers are generally accessible to any program executing upon the microprocessor. The general purpose register may be specified as a source or destination for data corresponding to an arbitrary instruction, and typically may store an arbitrary value. Often, general purpose registers are used to store values corresponding to a storage location within a main memory coupled to the microprocessor. Instructions may manipulate the values stored in the general purpose registers, and the manipulation results may eventually be returned to main memory. As an example, the x86 microprocessor includes general purpose registers such as EAX, EBX, ECX, EDX, EDI, ESI, EBP, and ESP. It is noted that, although these x86 registers are referred to as general purpose, certain ones of these registers do have specific interpretations. For example, the ESP register stores a pointer to the top of a stack structure which is referenced by certain instructions. Using the ESP (or other general purpose registers which have a specific interpretation) to store an arbitrary value may cause unexpected results for instructions which rely upon that specific interpretation.

Special registers are often managed in a more restrictive manner than the general purpose registers. While general purpose registers may be explicitly accessed by any program, special registers often are explicitly accessible to only a limited set of programs. For example, operating system routines may be able to access special registers, but ordinary application programs may not be able to access the special registers explicitly. Often, specific instructions are used to access and modify (i.e. read and write) the special registers. Arbitrary instructions may not explicitly read or write the special registers.

As opposed to general purpose registers, special registers generally may not be assigned arbitrary values. Special registers often store values indicative of the "mode" or "state" of the microprocessor. Microprocessors typically may be placed into one of many modes. These modes indicate the configuration of the microprocessor, i.e. an environment within which instructions are executed. Instructions may execute differently depending upon the mode of the microprocessor. For example, x86 microprocessors include an optional paging mechanism within the address translation mechanism. Paging may be enabled or disabled via a particular value in a special register. Additionally, the segment registers defined by the x86 microprocessor address translation structure (i.e. the CS, DS, SS, ES, FS, and GS registers) are special registers. These registers store information indicating the translation of a virtual address comprising an offset and segment identifier into a linear address. The linear address may be equal to the physical address used to access memory, or may be presented to the paging mechanism for further translation. The translation to a linear address assigns certain attributes to the address. Additional attributes may be assigned to the address via the paging mechanism. Therefore, instructions which access memory may execute in different numbers of clock cycles dependent upon the segment register values and whether or not the paging mechanism is active.

Although arbitrary instructions do not explicitly read or write special registers, these instructions may often be implicitly dependent upon the values stored in special registers. For example, instructions which access memory are dependent upon one of the segment registers for translation and upon the paging mode (i.e. enabled or disabled). With respect to a special register value, an instruction is dependent if the result of the instruction is at least in part determined by the value in the special register. Instructions may be explicitly dependent (i.e. an instruction defined to read the contents of the special register is explicitly dependent upon the value stored in the register). Explicit dependencies are similar to general purpose register dependencies. Additionally, instructions may be implicitly dependent upon a special purpose register. The segment register and paging mode dependencies of an instruction which accesses memory are implicit dependencies. The instruction does not specifically read the special register, but its operation is dependent upon the special register's value.

Because changing a special register may change the mode of the microprocessor, writes to special registers have typically been performed in a serialized manner. When a particular instruction is serialized, all instructions prior to the particular instruction in program order are completed, then the particular instruction is dispatched and completed, then instructions subsequent to the particular instruction are dispatched. Speculative execution of instructions is thereby stopped when a write to a special register is detected. Unfortunately, such serialization decreases the overall performance of the microprocessor for cases in which instructions subsequent to the special register write are not implicitly or explicitly dependent upon the special register write. The special register write effectively creates a barrier around which speculative execution does not occur.

Because superscalar microprocessors rely on executing multiple instructions per clock cycle, serialization has an even larger impact upon superscalar microprocessor performance. During the clock cycle in which the special register write executes, only one instruction is executed. Additionally, clock cycles prior to the execution of the special register write may experience decreased instruction execution rates since instructions subsequent to the special register write are stalled. Still further, superscalar microprocessors which employ the x86 microprocessor architecture suffer from serialization upon segment register writes because the segment registers are updated frequently as compared to other special register updates. For example, the segment registers are changed at every task switch of a multi-tasking operating system. Additionally, the data segment registers may be updated frequently during the execution of a particular program which accesses many different data segments. A method for updating special registers without serialization is desired.

SUMMARY OF THE INVENTION

The problems outlined above are in large part solved by a microprocessor employing an apparatus for performing special register writes without serialization. The apparatus detects certain special register write instructions when the instructions are dispatched, and stores an indication of the write in a special register dependency block. Instructions subsequent to the special register write instruction are examined for both explicit and implicit dependencies upon the special register write. If a dependency is detected with respect to a particular instruction, the instruction is dispatched to a reservation station along with an indication of the dependency. Instructions subsequent to the special register write instruction which are not dependent upon the special register are dispatched without an indication of special register dependency. Instructions without dependencies may speculatively execute prior to instructions with dependencies, or even prior to the special register write instruction. Advantageously, instructions which were previously stalled due to serialization may execute speculatively. Instruction throughput may be improved, improving the overall performance of the microprocessor. Superscalar microprocessors may particularly benefit from such an apparatus, since superscalar microprocessor performance is characterized by execution of multiple instructions per clock cycle.

In one particular embodiment employing the x86 microprocessor architecture, the microprocessor detects updates to the DS, ES, FS, and GS segment registers (i.e. the data segment registers). Updates to other segment registers are serialized. Such an embodiment may be particularly beneficial for instruction sequences which access large numbers of data segments. The data segment registers may be modified within these instruction sequences with significantly less impact upon the amount of time required to execute the instruction sequences than if the microprocessor serialized upon each modification to the data segment registers.

Broadly speaking, the present invention contemplates an apparatus for accessing special registers in a microprocessor. The apparatus includes a storage, a buffer, a storage device, at least one decode unit, and at least one reservation station. The storage includes a plurality of storage locations corresponding to a plurality of special registers. Coupled to the storage, the buffer is configured to store an operation which modifies one of the plurality of special registers. The operation corresponds to a first instruction executed by the microprocessor. The storage device is configured to store a first indication of one of the plurality of special registers. Coupled to receive the first indication from the storage device, the decode unit is configured to identify a second instruction dependent upon said one of the plurality of special registers. Additionally, the decode unit is configured to dispatch the second instruction along with the first indication. The reservation station is coupled to receive the second instruction and the first indication, and is configured to store the second instruction until the first instruction is performed.

The present invention further contemplates a method for updating special registers without serialization within a microprocessor. A first operation which updates a special register is detected. An instruction subsequent to the first operation which depends upon the special register is subsequently detected. The instruction and subsequent instruction are dispatched to at least one reservation station, and the dependency upon the special register is indicated. Upon receiving the dependency indication, the reservation station holds the instruction until the first operation completes. The subsequent instructions are executed out of order with respect to the dependent instruction.

BRIEF DESCRIPTION OF THE DRAWINGS

Other objects and advantages of the invention will become apparent upon reading the following detailed description and upon reference to the accompanying drawings in which.

Figure 1:
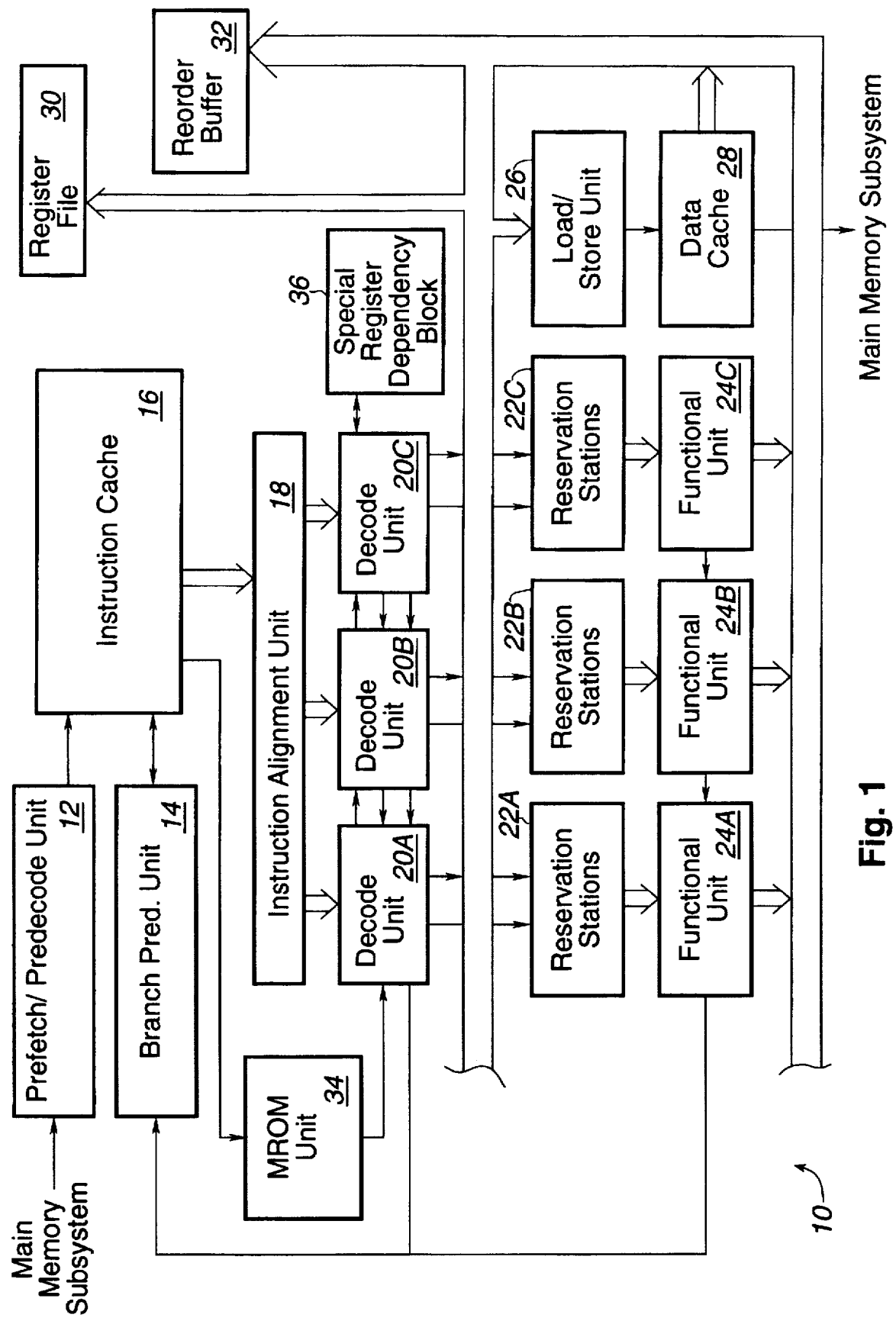
FIG. 1 is a block diagram of a superscalar microprocessor including a plurality of decode units.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, and an MROM unit 34. Additionally, microprocessor 10 includes a special register dependency block 36. Blocks referred to herein with a reference number followed by a letter will be collectively referred to by the reference number alone. For example, decode units 20A–20C will be collectively referred to as decode units 20.

Prefetch/predecode unit 12 is coupled to receive instructions from a main memory subsystem (not shown), and is coupled to instruction cache 16. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. Special register dependency block 36 is coupled to decode units 20. Finally, MROM unit 34 is coupled to decode units 20.

Generally speaking, special register dependency block 36 is configured to store indications of writes to special registers. Decode units 20 include decode circuitry which detects both implicit and explicit dependencies upon special registers. If a special register write has been detected and not completed and decode units 20 detect an instruction dependent upon that special register, decode units 20 pass an indication of the dependency with the instructions to reservation stations 22. Instructions which are not dependent upon that special register are processed and dispatched normally. Advantageously, instructions which are subsequent to a special register write but which do not depend upon that special register may be speculatively executed. Performance may be increased due to the speculative execution of instructions near special register writes, in contrast to the serialization of such instructions as performed previously.

Instruction cache 16 is a high speed cache memory provided to store instructions. Instructions are fetched from instruction cache 16 and dispatched to decode units 20. In one embodiment, instruction cache 16 is configured to store up to 32 kilobytes of instructions in an 8 way set associative structure having 16 byte lines (a byte comprises 8 binary bits). Instruction cache 16 may additionally employ a way prediction scheme in order to speed access times to the instruction cache. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct mapped configuration.

Instructions are fetched from main memory and stored into instruction cache 16 by prefetch/predecode unit 12. Instructions may be prefetched prior to instruction cache 16 recording a miss for the instructions in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below.

One encoding of the predecode tags for an embodiment of microprocessor 10 employing the x86 instruction set will next be described. If a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an SIB byte would have start, end, and functional bits as follows:

Start bits 10000
End bits 00001
Functional bits 11000

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20. A listing of exemplary x86 instructions categorized as fast path instructions will be provided further below.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Instructions are selected independently from each set of eight instruction bytes into preliminary issue positions. The preliminary issue positions are then merged to a set of aligned issue positions corresponding to decode units 20, such that the aligned issue positions contain the three instructions which are prior to other instructions within the preliminary issue positions in program order. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocated the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated similar to load/store unit 26 in that any of decode units 20 may dispatch instructions to the floating point unit.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 26 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases.

Figure 2:
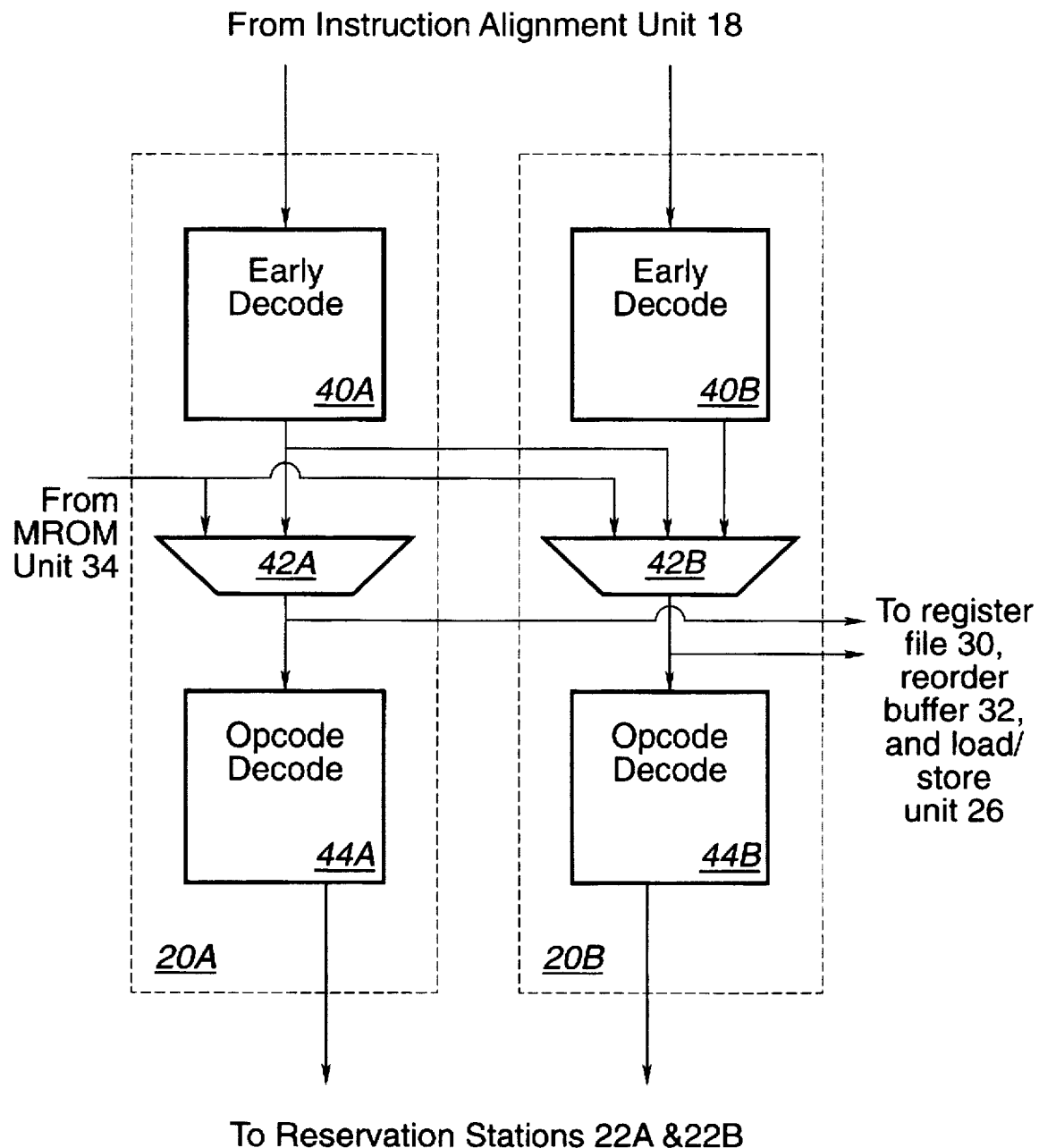
FIG. 2 is a block diagram of one embodiment of two of the decode units shown in FIG. 1.

Turning now to FIG. 2, a block diagram of one embodiment of decode units 20A and 20B are shown. Each decode unit 20 receives an instruction from instruction alignment unit 18. Additionally, MROM unit 34 is coupled to each decode unit 20 for dispatching fast path instructions corresponding to a particular MROM instruction. Decode unit 20A comprises early decode unit 40A, multiplexor 42A, and opcode decode unit 44A. Similarly, decode unit 20B includes early decode unit 40B, multiplexor 42B, and opcode decode unit 44B.

Certain instructions in the x86 instruction set are both fairly complicated and frequently used. In one embodiment of microprocessor 10, such instructions include more complex operations than the hardware included within a particular functional unit 24A–24C is configured to perform. Such instructions are classified as a special type of MROM instruction referred to as a "double dispatch" instruction. These instructions are dispatched to a pair of opcode decode units 44. It is noted that opcode decode units 44 are coupled to respective reservation stations 22. Each of opcode decode units 44A–44C forms an issue position with the corresponding reservation station 22A–22C and functional unit 24A–24C. Instructions are passed from an opcode decode unit 44 to the corresponding reservation station 22 and further to the corresponding functional unit 24.

Multiplexor 42A is included for selecting between the instructions provided by MROM unit 34 and by early decode unit 40A. During times in which MROM unit 34 is dispatching instructions, multiplexor 42A selects instructions provided by MROM unit 34. At other times, multiplexor 42A selects instructions provided by early decode unit 40A. Similarly, multiplexor 42B selects between instructions provided by MROM unit 34, early decode unit 40A, and early decode unit 40B. The instruction from MROM unit 34 is selected during times in which MROM unit 34 is dispatching instructions. During times in which early decode unit 40A detects a fast path instruction having an SIB byte, the instruction from early decode unit 40A is selected by multiplexor 42B. Otherwise, the instruction from early decode unit 40B is selected. When early decode unit 40A detects a fast path instruction having an SIB byte, an instruction for calculating the address specified by the SIB byte is dispatched to opcode decode unit 44A. Opcode decode unit 44B receives the fast path instruction.

According to one embodiment employing the x86 instruction set, early decode units 40 perform the following operations:

(i) merge the prefix bytes of the instruction into an encoded prefix byte;

(ii) decode unconditional branch instructions (which may include the unconditional jump, the CALL, and the RETURN) which were not detected during branch prediction;

(iii) decode source and destination flags;

(iv) decode the source and destination operands which are register operands and generate operand size information; and (v) determine the displacement and/or immediate size so that displacement and immediate data may be routed to the opcode decode unit.

Opcode decode units 44 are configured to decode the opcode of the instruction, producing control values for functional unit 24. Displacement and immediate data are routed with the control values to reservation stations 22.

Since early decode units 40 detect operands, the outputs of multiplexors 42 are routed to register file 30 and reorder buffer 32. Operand values or tags may thereby be routed to reservation stations 22. Additionally, memory operands are detected by early decode units 40. Therefore, the outputs of multiplexors 42 are routed to load/store unit 26. Memory operations corresponding to instructions having memory operands are stored by load/store unit 26.

Figure 3:
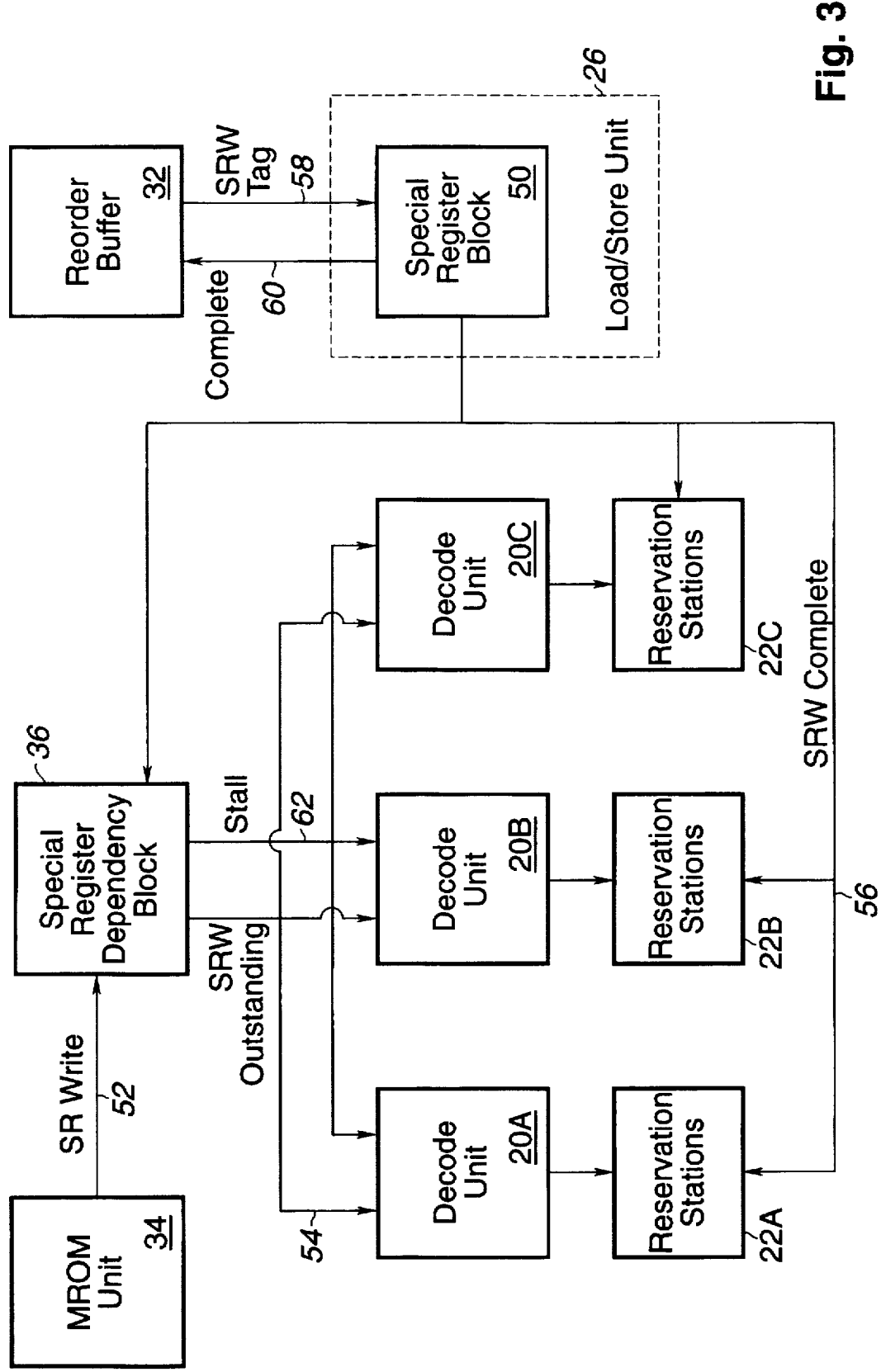
FIG. 3 is a block diagram of several units shown in FIG. 1, highlighting interconnection between the units according to one embodiment of the microprocessor.

Turning now to FIG. 3, a block diagram of a portion of microprocessor 10 is shown. Interconnection between the units within the portion is highlighted according to one embodiment of microprocessor 10. FIG. 3 includes reorder buffer 32, load/store unit 26, decode units 20, reservation stations 22, MROM unit 34, and special register dependency block 36. Load/store unit 26 includes a special register block 50 in the embodiment shown.

MROM unit 34 detects instructions which write a special register. An indication of the detected instruction is conveyed upon an SR write bus 52 to special register dependency block 36. The instruction which performs the write is routed to special register block 50 within load/store unit 26. Upon receipt of an indication upon SR write bus 52, special register dependency block 36 stores an indication of the special register. Indications of each special register to which a write is outstanding are conveyed by special register dependency block 36 to each decode unit 20 upon SRW outstanding bus 54. Decode units 20 detect instructions which depend upon the special registers for which writes are outstanding. For each instruction which depends upon one of the indicated special registers, decode units 20 dispatch the indication from SRW outstanding bus 54 corresponding to the special register along with the dependent instruction. If an instruction is not dependent upon the special registers, no indications are dispatched with the instruction. Instructions with no special register dependencies may speculatively execute prior to special-register-dependent instructions, and even prior to the special register write. Advantageously, instructions are speculatively executed where previously serialization was performed.

Reservation stations 22 receive the instructions from decode units 20. If an indication of special register dependency is received with a particular instruction, reservation stations 22 are configured to store the particular instruction until the corresponding special register write is completed. An SRW complete bus 56 coupled between reservation stations 22 and special register block 50 is used to convey an indication that a special register write has completed. Reservation stations 22 discard the indication of special register dependency upon receipt of the corresponding indication upon SRW complete bus 56. When each special register upon which a particular instruction depends has been updated, reservation stations 22 convey the particular instruction to the corresponding function unit 24 for execution. Therefore, the conditions under which an instruction is executed are: (i) the operands for the instruction have been provided; and (ii) the special register writes upon which the instruction depends have been completed. Special register dependency block 36 is also coupled to SRW complete bus 56, such that the dependency indications stored therein may be discarded when the corresponding special register write completes. It is noted that, in contrast to operands for which an operand value is provided for instruction execution, special register dependencies do not provide the special register value to the instruction. Instead, the dependency simply stalls execution of the instruction until the special register write completes. The microprocessor is thereby placed into the intended mode before the dependent instruction executes.

In one embodiment, special register block 50 completes a special register write (i.e. updates the storage location therein corresponding to the special register) when the instruction associated with the special register write is ready to be retired by reorder buffer 32. The special register write instruction becomes ready for retirement when instructions prior to the special register write instruction (in program order) have been retired. Reorder buffer 32 conveys a reorder buffer tag upon an SRW tag bus 58 coupled to special register block 50, which performs the update upon receipt of the corresponding reorder buffer tag. A complete signal is returned to reorder buffer 32 upon a completed conductor 60 in order to inform reorder buffer 32 that the update has been performed. Reorder buffer 32 may then discard the associated special register write instruction.

A second write to a particular special register may be detected prior to the completion of a first write to the particular special register. If such a scenario occurs, the dependency indication corresponding to the first write to the particular special registers is stored in special register dependency block 36. When MROM unit 34 signals special register dependency block 36 (via SR write bus 52) of the second write, special register dependency block 36 examines the outstanding special register writes. Upon detection of the first write, special register dependency block 36 asserts a stall signal to decode units 20 upon a stall conductor 62. Decode units 20 cease dispatching instructions when the stall signal is asserted, thereby stalling dispatch of the second write. The stall signal remains asserted until the first write completes. It is noted that the stall signal may be detected by decode units 20 and distributed to the other decode units, instead of detecting the stall in special register dependency block 36.

In one embodiment, the indications of special register writes comprise a bit corresponding to each special register for which non-serialized update is desirable. The bit is indicative, when set, of an outstanding (i.e. dispatched but not completed) write to the corresponding special register. A signal upon SR write bus 52 is assigned to each special register, and MROM unit 34 asserts the corresponding signal upon detection of a write to the special register. Special register dependency block 36 sets the corresponding bit upon assertion of the signal upon SR write bus 52. Similarly, SRW complete bus 56 comprises a signal for each special register stored in special register dependency block 36. Both special register dependency block 36 and reservation stations 22 reset the corresponding bit when a signal upon SRW complete bus 56 is asserted. A bit may be assigned to each special register within microprocessor 10, or a subset of the special registers may be non-serialized. Those special registers not assigned a bit in special register dependency block 36 are performed via a serialization.

In one particular embodiment, updates to four special registers are not serialized: the DS, ES, FS, and GS segment registers of the x86 microprocessor architecture. These segment registers are typically used for data segments, and therefore may be changed often during execution of certain programs. By not serializing these special register writes, programs which change data segments (i.e. contiguous areas of memory identified by the segment registers as storing data) may enjoy increased performance. Instructions which use memory operands reference a default segment, and a segment override prefix byte may be included in an instruction to override the default segment. Therefore, decode units 20 may decode the default segments for instructions which use memory operands and detect the segment override prefix bytes in order to detect instruction dependencies upon writes to the data segment registers.

In another embodiment, a value may be stored for each outstanding special register write. The value includes n-bits, where the n-bits are sufficient to uniquely identify each of the special registers. This embodiment does not identify certain special registers for non-serialized update. Instead, up to four arbitrary special register writes may be outstanding. If a fifth special register write is detected, then instruction dispatch is stalled until one of the outstanding special register writes completes. SR write bus 52, SRW outstanding bus 54, and SRW complete bus 56 convey one or more n-bit values for this embodiment. Additionally, reservation stations 22 and special register dependency block 36 include comparators for comparing the values conveyed upon SRW complete bus 56 to the values currently stored as outstanding special register writes. When a stored value compares equal to the value conveyed upon SRW complete bus 56, that value is discarded.

It is noted that special register dependency block 36 may also receive indications of special register write instructions which are discarded from reorder buffer 32 when a branch misprediction is detected. The indications may be conveyed upon SRW complete bus 56, similar to instructions which have completed. In this manner, indications of special register write instructions which have been discarded are deleted from special register dependency block 36.

It is further noted that the embodiment of microprocessor 10 shown in FIG. 1 does not include a reservation station for load/store unit 26. Instead, load/store unit 26 may included a buffer for load and store memory operations provided by decode units 20. The buffer may store dependencies of memory operations upon a special register write, similar to reservation stations 22, and load/store unit 26 may be configured not to perform a memory access if the corresponding dependency value indicates a dependency upon an outstanding special register write. Alternatively, embodiments of microprocessor 10 may include reservation stations for load/store unit 26, and the reservation stations may be configured similar to reservation stations 22.

Figure 4:
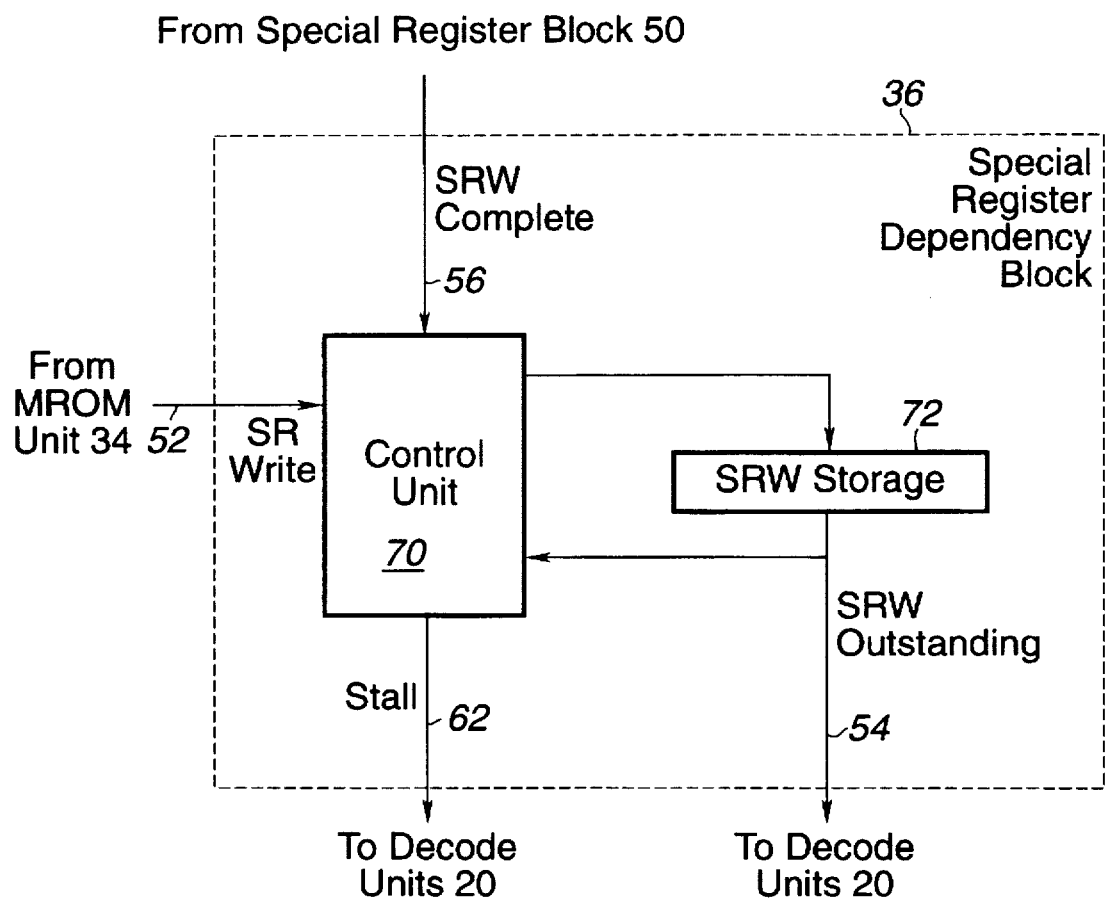
FIG. 4 is a block diagram of one embodiment of a special register dependency block shown in FIG. 1.

Turning now to FIG. 4, a block diagram of one embodiment of special register dependency block 36 is shown. Special register dependency block 36 includes a control unit 70 and an SRW storage 72. Control unit 70 is coupled to SRW complete bus 56, SR write bus 52, stall conductor 62, and SRW storage 72. SRW storage 72 is additionally coupled to SRW outstanding bus 54.

Control unit 70 stores indications of special register writes received upon SR write bus 52 into SRW storage 72. The indications may be individual bits corresponding to certain special registers, or may be n-bit values identifying the special registers. SRW storage 72 is configured to store up to a number of special register writes. In one embodiment, up to four special register writes may be outstanding.

The values stored in SRW storage 72 are conveyed upon SRW outstanding bus 54 to decode units 20. Additionally, the values stored in SRW storage 72 are conveyed to control unit 70. Prior to storing a newly received special register write indication into SRW storage 72, control unit 70 determines if a write to the indicated special register is already outstanding. If a write is already outstanding, control unit 70 asserts the stall signal upon stall conductor 62. Instruction dispatch, including the second special register write, is thereby halted until the first write to the indicated special register write is complete. It is noted that a pair of writes to the same special register typically do not occur near enough in a code sequence to cause such a stall. Therefore, the stall mechanism may not unduly affect performance of microprocessor 10.

Control unit 70 additionally receives SRW complete bus 56. When an indication of a completed special register write is conveyed upon SRW complete bus 56, control unit 70 discards the corresponding value from within SRW storage 72. For example, if SRW storage 72 stores a bit indicative of a write to a particular special register, the bit is reset when the corresponding special register write is indicated as complete upon SRW complete bus 56.

Figure 5:
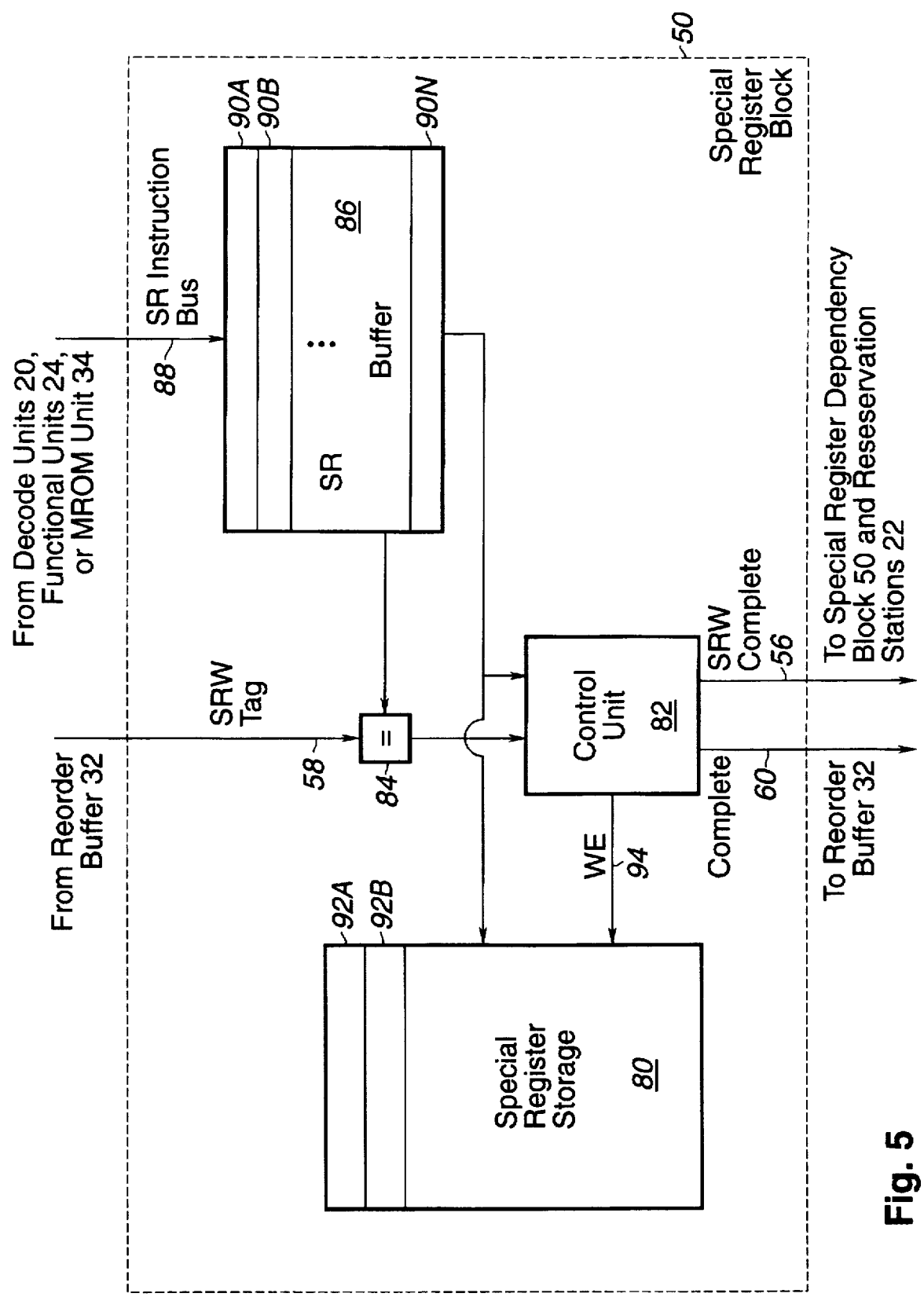
FIG. 5 is a block diagram of one embodiment of a special register block shown in FIG. 3.

Turning now to FIG. 5, a block diagram of one embodiment of special register block 50 is shown. Special register block 50 includes a special register storage 80, a control unit 82, a comparator 84, and an SR buffer 86. SR buffer 86 is coupled to an SR instruction bus 88. SR instruction bus 88 conveys segment register read and write instructions to special register block 50. In various embodiments, SR instruction bus 88 may originate in decode units 20, functional units 24, or MROM unit 34. SR buffer 86 includes a plurality of storage locations 90A–90N. Comparator 84 is coupled to storage location 90N and to SRW tag bus 58, and transmits comparison results to control unit 82. Storage location 90N is additionally coupled to control unit 82 and to a read/write port upon special register storage 80. Special register storage 80 includes a plurality of storage locations including storage locations 92A and 92B, and receives a write enable (WE) bus 94 from control unit 82. Each storage location 92 corresponds to a particular special register. Finally, control unit 82 is coupled to complete conductor 60 and SRW complete bus 56.

Special register read and write instructions are stored into SR buffer 86. As shown in FIG. 5, SR buffer 86 operates as a first-in, first-out (FIFO) buffer. Special register read and write instructions are thereby performed in program order with respect to other special register read and write instructions. When a reorder buffer tag is received upon SRW tag bus 58, comparator 84 compares the reorder buffer tag to the reorder buffer tag stored in storage location 90N. Storage location 90N, being the "bottom" storage location in SR buffer 86, stores the special register instruction which is prior to each other special register instruction in SR buffer 86 (in program order). If the reorder buffer tags compare equal, then the special register instruction stored in storage location 90N is performed. If the special register instruction is a write, control unit 82 asserts a write enable signal upon write enable bus 94 corresponding to the special register indicated by the special register instruction. If the special register instruction is a read, no write enable signals are asserted. Control unit 82 causes the indicated special register to be accessed for reads. It is noted that control unit 82 may be configured to perform special register reads independent of an indication upon SRW tag bus 58. It is further noted that additional busing (not shown) is used to forward the result of a special register read to reorder buffer 32 and reservation stations 22.

In addition to performing the read or write within special register storage 80, control unit 82 asserts a complete signal upon complete conductor 60. Reorder buffer receives the complete signal as an indication that the instruction corresponding to the reorder buffer tag upon SRW tag bus 58 has been completed. Still further, control unit 82 conveys an indication of the completed special register write upon SRW complete bus 56. Reservation stations 22 and special register dependency block 36 may thereby discard the corresponding special register dependency values. It is noted that writing certain special registers may involve additional actions ("side effects"), as well as updating the register. For example, if one of the segment registers specified by the x86 microprocessor architecture is updated, a segment descriptor is read from main memory and written into registers associated with that segment register. Control unit 82 may not assert the complete signal until the side effects have been successfully completed.

In an embodiment of microprocessor 10 employing the x86 microprocessor architecture, exemplary special registers which may be stored in special register storage 80 include the special registers listed in Table 1 below. The registers are described briefly in the table, but are well known to those of skill in the art.

TABLE 1

Special Registers

| Register | Meaning |
| --- | --- |
| Segment Registers (CS, SS, DS, ES, FS, and GS) | Segment translation registers. |
| LDTR | Identifies the local segment |

TABLE 1-continued

Special Registers

| Register | Meaning |
| --- | --- |
| | descriptor table in memory. |
| TR | Identifies a task descriptor for the currently executing task. |
| GDTR | Identifies the global segment descriptor table in memory. |
| IDTR | Identifies the interrupt segment descriptor table in memory. |
| FPDP | Floating Point Data Pointer. |
| Debug registers | X86 architected debug registers. |

Figure 6:
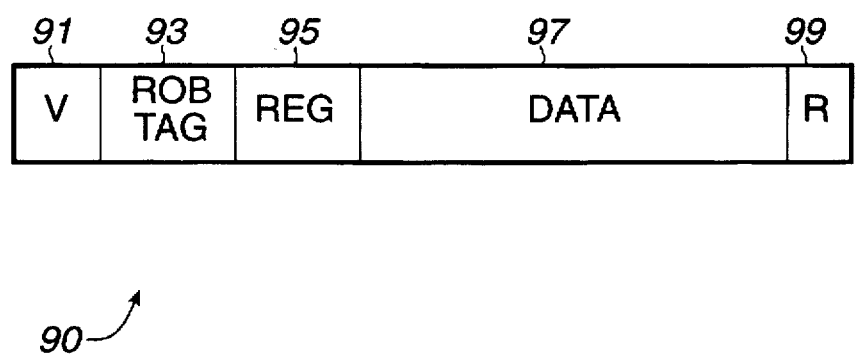
FIG. 6 is a diagram of information stored in a buffer shown in FIG. 5, according to one embodiment of the buffer.

Turning next to FIG. 6, a diagram of information stored in one of the storage locations 90 in SR buffer 86 is shown, according to one embodiment of SR buffer 86. Storage location 90 stores several fields, including valid field 91, ROB tag field 93, REG field 95, Data field 97, and R field 99. Valid field 91 is an indication that the storage location 90 is presently storing a special register instruction. In one embodiment, valid field 91 comprises a bit indicative, when set, that the storage location is storing a special register instruction.

ROB tag field 93 stores the reorder buffer tag corresponding to the special register instruction. ROB tag field 93 is conveyed by storage location 90N to comparator 84 for comparison with the reorder buffer tag conveyed upon SRW tag bus 58. In one embodiment, ROB tag field 93 comprises five bits identifying a particular entry within reorder buffer 32.

REG field 95 stores a register pointer value indicative of the special register accessed by the special register instruction stored in storage location 90. In one embodiment, REG field 95 comprises five bits. REG field 95 uniquely identifies the special register within special register storage 80. Control unit 82 uses the value of REG field 95 to determine which storage location 92 to access within special register storage 80.

Data field 97 stores the data value to be written into the special register identified by REG field 95 (for special register write instructions). In one embodiment, data field 97 comprises 32 bits. Finally, R field 99 stores an indication of whether the special register instruction is a read or write operation. In one embodiment, R field 99 comprises a bit indicative, when set, that the operation is a read operation. When clear, the bit indicates that the operation is a write operation.

Figure 7:
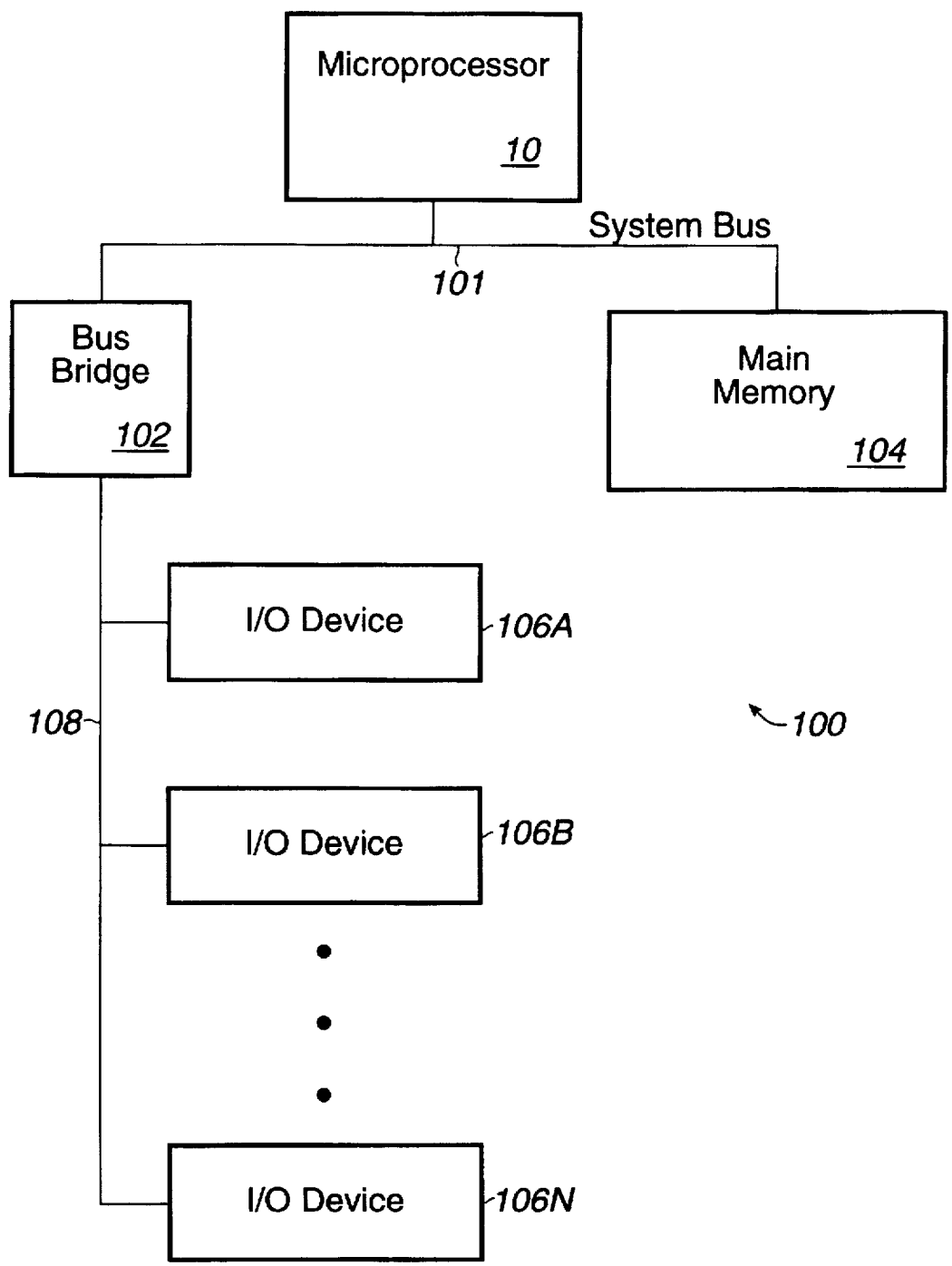
FIG. 7 is a block diagram of one embodiment of a computer system including the microprocessor shown in FIG. 1.

Turning now to FIG. 7, a computer system 100 including microprocessor 10 is shown. Computer system 100 further includes a bus bridge 102, a main memory 104, and a plurality of input/output (I/O) devices 106A–106N. Plurality of I/O devices 106A–106N will be collectively referred to as I/O devices 106. Microprocessor 10, bus bridge 102, and main memory 104 are coupled to system bus 101. I/O devices 106 are coupled to an I/O bus 108 for communication with bus bridge 102.

Bus bridge 102 is provided to assist in communications between I/O devices 106 and devices coupled to system bus 101. I/O devices 106 typically require longer bus clock cycles than microprocessor 10 and other devices coupled to system bus 101. Therefore, bus bridge 102 provides a buffer between system bus 101 and input/output bus 108. Additionally, bus bridge 102 translates transactions from one bus protocol to another. In one embodiment, input/output bus 108 is an Enhanced Industry Standard Architecture (EISA) bus and bus bridge 102 translates from the system bus protocol to the EISA bus protocol. In another embodiment, input/output bus 108 is a Peripheral Component Interconnect (PCI) bus and bus bridge 102 translates from the system bus protocol to the PCI bus protocol. It is noted that many variations of system bus protocols exist. Microprocessor 10 may employ any suitable system bus protocol.

I/O devices 106 provide an interface between computer system 100 and other devices external to the computer system. Exemplary I/O devices include a modem, a serial or parallel port, a sound card, etc. I/O devices 106 may also be referred to as peripheral devices. Main memory 104 stores data and instructions for use by microprocessor 10. In one embodiment, main memory 104 includes at least one Dynamic Random Access Memory (DRAM) and a DRAM memory controller.

It is noted that although computer system 100 as shown in FIG. 7 includes one microprocessor, other embodiments of computer system 100 may include multiple microprocessors similar to microprocessor 10. Similarly, computer system 100 may include multiple bus bridges 102 for translating to multiple dissimilar or similar I/O bus protocols. Still further, a cache memory for enhancing the performance of computer system 100 by storing instructions and data referenced by microprocessor 10 in a faster memory storage may be included. The cache memory may be inserted between microprocessor 10 and system bus 101, or may reside on system bus 101 in a "lookaside" configuration.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Table 2 below indicates fast path, double dispatch, and MROM instructions for one embodiment of microprocessor 10 employing the x86 instruction set:

TABLE 2 x86 Fast Path, Double Dispatch, and MROM Instructions

| x86 Instruction | Instruction Category |
| --- | --- |
| AAA | MROM |
| AAD | MROM |
| AAM | MROM |
| AAS | MROM |
| ADC | fast path |
| ADD | fast path |
| AND | fast path |
| ARPL | MROM |
| BOUND | MROM |
| BSF | fast path |
| BSR | fast path |
| BSWAP | MROM |
| BT | fast path |
| BTC | fast path |
| BTR | fast path |

TABLE 2-continued x86 Fast Path, Double Dispatch, and MROM Instructions

| x86 Instruction | Instruction Category |
| --- | --- |
| BTS | fast path |
| CALL | fast path |
| CBW | fast path |
| CWDE | fast path |
| CLC | fast path |
| CLD | fast path |
| CLI | MROM |
| CLTS | MROM |
| CMC | fast path |
| CMP | fast path |
| CMPS | MROM |
| CMPSB | MROM |
| CMPSW | MROM |
| CMPSD | MROM |
| CMPXCHG | MROM |
| CMPXCHG8B | MROM |
| CPUID | MROM |
| CWD | MROM |
| CWQ | MROM |
| DDA | MROM |
| DAS | MROM |
| DEC | fast path |
| DIV | MROM |
| ENTER | MROM |
| HLT | MROM |
| IDIV | MROM |
| IMUL | double dispatch |
| IN | MROM |
| INC | fast path |
| INS | MROM |
| INSB | MROM |
| INSW | MROM |
| INSD | MROM |
| INT | MROM |
| INTO | MROM |
| INVD | MROM |
| INVLPG | MROM |
| IRET | MROM |
| IRETD | MROM |
| Jcc | fast path |
| JCXZ | double dispatch |
| JECXZ | double dispatch |
| JMP | fast path |
| LAHF | fast path |
| LAR | MROM |
| LDS | MROM |
| LES | MROM |
| LFS | MROM |
| LGS | MROM |
| LSS | MROM |
| LEA | fast path |
| LEAVE | double dispatch |
| LGDT | MROM |
| LIDT | MROM |
| LLDT | MROM |
| LMSW | MROM |
| LODS | MROM |
| LODSB | MROM |
| LODSW | MROM |
| LODSD | MROM |
| LOOP | double dispatch |
| LOOPcond | MROM |
| LSL | MROM |
| LTR | MROM |
| MOV | fast path |
| MOVCC | fast path |
| MOV CR | MROM |
| MOV DR | MROM |
| MOVS | MROM |
| MOVSB | MROM |
| MOVSW | MROM |
| MOVSD | MROM |
| MOVSX | fast path |
| MOVZX | fast path |

TABLE 2-continued x86 Fast Path, Double Dispatch, and MROM Instructions

| x86 Instruction | Instruction Category |
|---|---|
| MUL | double dispatch |
| NEG | fast path |
| NOP | fast path |
| NOT | fast path |
| OR | fast path |
| OUT | MROM |
| OUTS | MROM |
| OUTSB | MROM |
| OUTSW | MROM |
| OUTSD | MROM |
| POP | double dispatch |
| POPA | MROM |
| POPAD | MROM |
| POPF | MROM |
| POPFD | MROM |
| PUSH | double dispatch |
| PUSHA | MROM |
| PUSHAD | MROM |
| PUSHF | fast path |
| PUSHFD | fast path |
| RCL | MROM |
| RCR | MROM |
| ROL | fast path |
| ROR | fast path |
| RDMSR | MROM |
| REP | MROM |
| REPE | MROM |
| REPZ | MROM |
| REPNE | MROM |
| REPNZ | MROM |
| RET | double dispatch |
| RSM | MROM |
| SAHF | fast path |
| SAL | fast path |
| SAR | fast path |
| SHL | fast path |
| SHR | fast path |
| SBB | fast path |
| SCAS | MROM |
| SCASB | MROM |
| SCASW | MROM |
| SCASD | MROM |
| SETcc | fast path |
| SGDT | MROM |
| SIDT | MROM |
| SHLD | MROM |
| SHRD | MROM |
| SLDT | MROM |
| SMSW | MROM |
| STC | fast path |
| STD | fast path |
| STI | MROM |
| STOS | MROM |
| STOSB | MROM |
| STOSW | MROM |
| STOSD | MROM |
| STR | MROM |
| SUB | fast path |
| TEST | fast path |
| VERR | MROM |
| VERW | MROM |
| WBINVD | MROM |
| WRMSR | MROM |
| XADD | MROM |
| XCHG | MROM |
| XLAT | fast path |
| XLATB | fast path |
| XOR | fast path |

Note: Instructions including an SIB byte are also considered fast path instructions.

It is noted that a superscalar microprocessor in accordance with the foregoing may further employ the latching structures as disclosed within the co-pending, commonly assigned patent application entitled "Conditional Latching Mechanism and Pipelined Microprocessor Employing the Same", Ser. No. 08/400,608 filed Mar. 8, 1995, by Pflum et al. The disclosure of this patent application is incorporated herein by reference in its entirety.

It is further noted that aspects regarding array circuitry may be found in the co-pending, commonly assigned patent application entitled "High Performance Ram Array Circuit Employing Self-Time Clock Generator for Enabling Array Access", Ser. No. 08/473,103 filed Jun. 7, 1995 by Tran. The disclosure of this patent application is incorporated herein by reference in its entirety.

It is additionally noted that other aspects regarding superscalar microprocessors may be found in the following co-pending, commonly assigned patent applications: "Linearly Addressable Microprocessor Cache", Ser. No. 08/146,381, filed Oct. 29, 1993 by Witt; "Superscalar Microprocessor Including a High Performance Instruction Alignment Unit", Ser. No. 08/377,843, filed Jan. 25, 1995 by Witt, et al; "A Way Prediction Structure", Ser. No. 08/522,181, filed Aug. 31, 1995 by Roberts, et al; "A Data Cache Capable of Performing Store Accesses in a Single Clock Cycle", Ser. No. 08/521,627, filed Aug. 31, 1995 by Witt, et al; "A Parallel and Scalable Instruction Scanning Unit", Ser. No. 08/475,400, filed Jun. 7, 1995 by Narayan; and "An Apparatus and Method for Aligning Variable-Byte Length Instructions to a Plurality of Issue Positions", Ser. No. 08/582,473 filed Jan. 2, 1996 by Narayan, et al. The disclosure of these patent applications are incorporated herein by reference in their entirety.

In accordance with the above disclosure, an apparatus for performing special register writes in a microprocessor without performing a serialization process has been described. Instead, the instructions subsequent to the special register write are checked for both implicit and explicit dependencies. If an instruction is independent of the special register, the instruction may be executed. If the instruction is dependent upon the special register, the instruction is held until the special register write completes. Employing the apparatus in a microprocessor may increase performance by allowing instructions subsequent to the special register write to be executed out of order with the special register write if the subsequent instructions are independent of the special register write. Performance may be particularly increased in superscalar microprocessors which attempt to execute multiple instructions per clock cycle.

Numerous variations and modifications will become apparent to those skilled in the art once the above disclosure is fully appreciated. It is intended that the following claims be interpreted to embrace all such variations and modifications.

What is claimed is:

1. An apparatus for updating one of a plurality of special registers in a microprocessor, wherein said one of said plurality of special registers is included in a group consisting of a plurality of address segment translation registers, a floating point data pointer register and a plurality of microprocessor-architected debug registers, and wherein an update of each of said plurality of special registers changes a mode of operation for said microprocessor, said apparatus comprising:

a storage including a plurality of storage locations corresponding to said plurality of special registers;

a buffer coupled to said storage, wherein said buffer is configured to store an operation which updates one of said plurality of special registers, and wherein said operation corresponds to a first instruction executed by said microprocessor;

a storage device configured to store a first indication of said one of said plurality of special registers;

at least one decode unit coupled to receive said first indication from said storage device, wherein said decode unit is configured to identify a second instruction having implicit dependence upon said one of said plurality of special registers wherein said one of said plurality of special registers is not explicitly expressed in an encoding of said second instruction, and wherein said decode unit is configured to dispatch said second instruction along with said first indication; and at least one reservation station coupled to receive said second instruction and said first indication, wherein said reservation station is configured to store said second instruction until said first instruction is performed in response to said at least one decode unit identifying said implicit dependence.

2. The apparatus as recited in claim 1 further comprising a reorder buffer configured to convey a second indication indicative of retirement of said first instruction.

3. The apparatus as recited in claim 2 further comprising a first control unit coupled to said buffer, wherein said first control unit is configured to modify said one of said plurality of special registers in accordance with said first instruction.

4. The apparatus as recited in claim 3 wherein said first control unit is configured to modify said one of said plurality of special registers in response to said second indication.

5. The apparatus as recited in claim 4 further comprising a comparator circuit coupled to said first control unit, wherein said comparator circuit is coupled to receive said second indication from said reorder buffer, and wherein said comparator circuit is configured to determine if said second indication corresponds to said first instruction and to indicate said determination to said first control unit.

6. The apparatus as recited in claim 5 wherein said buffer is configured to store a reorder buffer tag indicative of a storage location within said reorder buffer, and wherein said second indication comprises a reorder buffer tag, and wherein said comparator compares said second indication to said reorder buffer tag stored in said buffer, and wherein said comparator determines that said second indication corresponds to said first instruction if said comparison indicates equality.

7. The apparatus as recited in claim 3 wherein said first control unit is configured to convey a third indication indicative of completion of modification of said one of said plurality of special registers.

8. The apparatus as recited in claim 7 further comprising a second control unit coupled to said storage device, wherein said second control unit is configured to remove said first indication from said storage device in response to said third indication.

9. The apparatus as recited in claim 8 wherein said second control unit is further configured to store said first indication within said storage device upon detection of said first instruction.

10. The apparatus as recited in claim 8 wherein said second control unit is further configured to detect a second operation which modifies said one of said plurality of special registers.

11. The apparatus as recited in claim 10 wherein said second control unit is configured to stall said decode unit until completion of said first instruction in response to said detection of a second operation.

12. The apparatus as recited in claim 1 wherein said first indication comprises a bit corresponding to said one of said plurality of special registers, and wherein said bit is indicative, when set, of said first instruction.

13. The apparatus as recited in claim 1 wherein said first indication comprises a value identifying one of said plurality of storage locations within said storage, wherein said one of said plurality of storage locations corresponds to said one of said plurality of special registers.

14. A method for updating special registers without serialization within a microprocessor, wherein said special registers are included in a group consisting of a plurality of address segment translation registers, a floating point data pointer register and a plurality of microprocessor-architected debug registers, and wherein an update of each of said plurality of special registers changes a mode of operation for said microprocessor, said apparatus comprising:

detecting a first operation which updates a special register;

detecting an instruction subsequent to said first operation which implicitly depends upon said special register, wherein said one of said plurality of special registers is not explicitly expressed in an encoding of said instruction;

indicating that said instruction is implicitly dependent upon said special register, and dispatching said instruction and subsequent instructions to at least one reservation station within said microprocessor;

holding said instruction in said reservation station until said first operation completes; and executing said subsequent instructions out of order with respect to said instruction.

15. The method as recited in claim 14 further comprising detecting a second operation which modifies said special register.

16. The method as recited in claim 15 further comprising stalling said second operation and instructions subsequent to said second operation until said first operation completes.

17. The method as recited in claim 14 wherein said first operation completes when a reorder buffer within said microprocessor indicates that said first operation is ready to retire.

18. The method as recited in claim 14 further comprising executing said instruction upon completion of said first operation.

19. An apparatus for updating one of a plurality of special registers in a microprocessor, wherein said one of said plurality of special registers is included in a group consisting of a plurality of address segment translation registers, a floating point data pointer register and a plurality of microprocessor-architected debug registers, and wherein an update of each of said plurality of special registers changes a mode of operation for said microprocessor, said apparatus comprising:

a storage device configured to store a first indication of an update to said one of said plurality of special registers, said update corresponding to a first instruction executed by said microprocessor;

at least one decode unit coupled to receive said first indication from said storage device, wherein said decode unit is configured to identify a second instruction having implicit dependence upon said one of said plurality of special registers wherein said one of said plurality of special registers is not explicitly expressed in an encoding of said second instruction, and wherein said decode unit is configured to dispatch said second instruction along with said first indication; and at least one unit coupled to receive said second instruction and said first indication, wherein said at least one unit is configured to store said second instruction until said first instruction is executed in response to said at least one decode unit identifying said implicit dependence.

* * * * *